(12) United States Patent
Okada (10) Patent No.: US 11,928,810 B2
(45) Date of Patent: Mar. 12, 2024

(54) ABNORMALITY DETECTION APPARATUS AND ABNORMALITY DETECTION METHOD

(71) Applicant: Tokyo Electron Limited, Tokyo (JP)

(72) Inventor: Motoi Okada, Sapporo (JP)

(73) Assignee: TOKYO ELECTRON LIMITED, Tokyo (JP)

(*) Notice: Subject to any disclaimer, the term of this patent is extended or adjusted under 35 U.S.C. 154(b) by 488 days.

(21) Appl. No.: 17/205,422

(22) Filed: Mar. 18, 2021

(65) Prior Publication Data

US 2021/0304383 A1 Sep. 30, 2021

(30) Foreign Application Priority Data

Mar. 25, 2020 (JP) ................................ 2020-054721

(51) Int. Cl.
*G06T 7/00* (2017.01)
*B05B 12/08* (2006.01)
*G06N 20/00* (2019.01)

(52) U.S. Cl.
CPC ............ *G06T 7/001* (2013.01); *B05B 12/084* (2013.01); *G06N 20/00* (2019.01); *G06T 2207/20081* (2013.01)

(58) Field of Classification Search
CPC .......... G06T 7/001; G06T 2207/20081; G06T 7/0004; B05B 12/084; B05B 12/08; G06N 20/00; G01N 21/91; G01N 21/8851; G01N 2021/8887; G01N 21/9515; B05C 5/00
See application file for complete search history.

(56) References Cited

U.S. PATENT DOCUMENTS

| | | | | |
|---|---|---|---|---|
| 6,888,958 | B1* | 5/2005 | Sawa | ........................ G06T 7/32 |
| | | | | 382/209 |
| 10,616,447 | B1* | 4/2020 | Schweid | .............. H04N 1/6055 |
| 2005/0265598 | A1* | 12/2005 | Noguchi | ................... G06T 7/50 |
| | | | | 382/167 |
| 2006/0251320 | A1* | 11/2006 | Diederichs | ........... H04N 1/6033 |
| | | | | 382/165 |
| 2017/0021631 | A1* | 1/2017 | Ono | ..................... B41J 2/16585 |

(Continued)

FOREIGN PATENT DOCUMENTS

| | | |
|---|---|---|
| JP | 2006-337152 A | 12/2006 |
| JP | 201874757 A | 5/2018 |

*Primary Examiner* — Lewis G West
(74) *Attorney, Agent, or Firm* — Nath, Goldberg & Meyer; Jerald L. Meyer; Tanya E. Harkins (57) ABSTRACT

An abnormality detection apparatus is provided. The abnormality detection apparatus includes a first generation part configured to generate pseudo-abnormal image data by synthesizing a substantially circular image at a random position of an image of normal image data obtained by photographing equipment that includes a liquid supply and supplies a liquid from the liquid supply without an abnormality, a second generation part configured to generate a determination model for determining whether the equipment is normal or abnormal by performing learning of the normal image data and the pseudo-abnormal image data, an acquisition part configured to acquire image data obtained by photographing the equipment, and a detection part configured detect an abnormality in the equipment from the image data acquired by the acquisition part using the determination model.

20 Claims, 4 Drawing Sheets

(56) References Cited

U.S. PATENT DOCUMENTS

| | | | | |
|---|---|---|---|---|
| 2018/0345703 | A1* | 12/2018 | Osadchyy | B41F 33/0063 |
| 2018/0348269 | A1* | 12/2018 | Ojima | G06F 18/217 |
| 2020/0357106 | A1* | 11/2020 | Lin | G06V 10/764 |
| 2020/0410655 | A1* | 12/2020 | Imamura | G06T 7/0004 |
| 2021/0019878 | A1* | 1/2021 | Iizawa | G06V 20/00 |
| 2021/0035284 | A1* | 2/2021 | Koba Yashi | G06T 7/0008 |
| 2021/0043482 | A1* | 2/2021 | Okamura | H01L 21/67023 |
| 2021/0080830 | A1* | 3/2021 | Kunugimoto | B05B 15/50 |
| 2021/0183036 | A1* | 6/2021 | Gurudath | B41J 2/16585 |
| 2021/0311384 | A1* | 10/2021 | Spence | G03F 7/70441 |
| 2022/0005736 | A1* | 1/2022 | Naohara | B05D 3/00 |
| 2022/0036529 | A1* | 2/2022 | Niederhofer | G06K 15/027 |
| 2022/0137514 | A1* | 5/2022 | Wang | G03F 7/70625 |
| | | | | 355/53 |
| 2022/0164938 | A1* | 5/2022 | Shiki | G06V 10/96 |
| 2022/0198638 | A1* | 6/2022 | Seki | B41J 2/2142 |
| 2022/0198712 | A1* | 6/2022 | Zhong | H04N 17/002 |
| 2022/0261974 | A1* | 8/2022 | Matsuda | G06T 5/50 |
| 2022/0351359 | A1* | 11/2022 | Zhang | G03F 7/70616 |
| 2023/0021965 | A1* | 1/2023 | Bönig | G01R 31/318508 |
| 2023/0123194 | A1* | 4/2023 | Boisvilliers | A61M 11/00 |
| | | | | 382/103 |
| 2023/0127741 | A1* | 4/2023 | Kips | G01G 19/414 |
| | | | | 132/286 |
| 2023/0341425 | A1* | 10/2023 | Tamezane | G01N 35/025 |

* cited by examiner

ABNORMALITY DETECTION APPARATUS AND ABNORMALITY DETECTION METHOD

CROSS-REFERENCE TO RELATED APPLICATION

This application is based upon and claims the benefit of priority from Japanese Patent Application No. 2020-054721, filed on Mar. 25, 2020, the entire contents of which are incorporated herein by reference.

TECHNICAL FIELD

The present disclosure relates to an abnormality detection apparatus and an abnormality detection method.

BACKGROUND

Patent Document 1 discloses a method of generating a changed inspection area image obtained by changing a feature amount from an image of an inspection area of a teaching image having the inspection area, and generating a new-defect-added teaching image obtained by disposing the changed inspection area image on the teaching image.

RELATED ART DOCUMENT

[Patent Document]
Patent Document 1: Japanese Patent Publication No. 2006-337152

SUMMARY

According to one embodiment of the present disclosure, an abnormality detection apparatus includes a first generation part, a second generation part, an acquisition part, and a detection part. The first generation part is configured to generate pseudo-abnormal image data by synthesizing a substantially circular image at a random position of an image of normal image data obtained by photographing equipment that includes a liquid supply and supplies a liquid from the liquid supply without an abnormality. The second generation part is configured to generate a determination model for determining whether the equipment is normal or abnormal by performing learning of the normal image data and the pseudo-abnormal image data. The acquisition part is configured to acquire image data obtained by photographing the equipment. The detection part is configured detect an abnormality in the equipment from the image data acquired by the acquisition part using the determination model.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the contents of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, embodiments of an abnormality detection apparatus and an abnormality detection method disclosed herein will be described in detail with reference to the accompanying drawings. The abnormality detection apparatus and abnormality detection method disclosed herein are not limited by the embodiments.

Abnormality detection using a learning model such as artificial intelligence (AI) has been studied. In the normality detection using the learning model, when the learning model is made to only learn normal image data when a monitoring object is operating normally, it may not be possible to accurately detect an abnormality in a narrow range. Therefore, the learning model may also learn abnormal image data in the case in which an abnormality occurs in the monitoring object. However, in reality, there are various places where an abnormality occurs in a monitoring object. In addition, it may be rare that an abnormality occurs in a monitoring object. For this reason, it may be difficult to acquire sufficient abnormal image data required for learning from abnormal image data in the case where an abnormality actually occurs in a monitoring object. As a result, an abnormality may not be detected accurately through abnormality detection using a learning model.

Therefore, a technique capable of detecting an abnormality with high accuracy is required.

Embodiment

[Monitoring Object]

Figure 1:
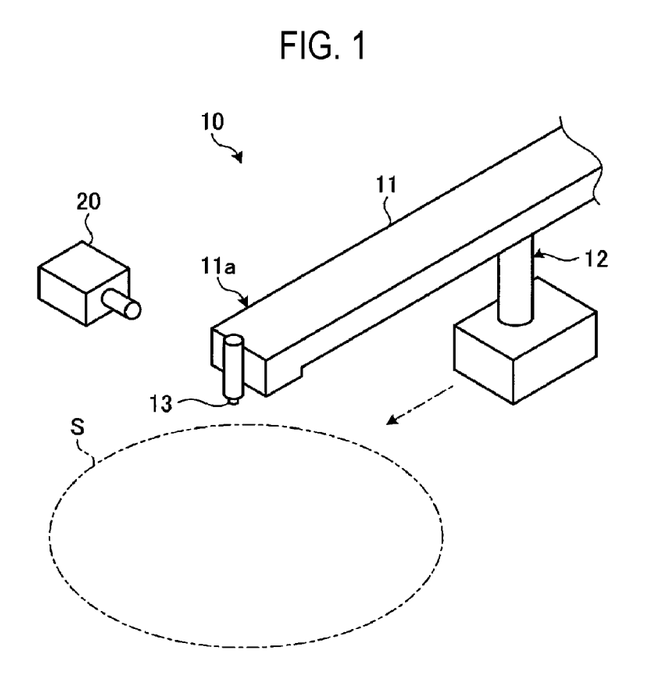
FIG. 1 is a schematic view illustrating an exemplary monitoring object according to an embodiment.

An embodiment will be described. Hereinafter, a case in which the occurrence of an abnormality of a monitoring object is detected using an abnormality detection apparatus will be described as an example. Further, hereinafter, a case in which the monitoring object is a coater that ejects a liquid will be described as an example. FIG. 1 is a schematic view illustrating an exemplary monitoring object according to an embodiment. In FIG. 1, a coater 10 that ejects a liquid is illustrated as a monitoring object. The coater 10 is exemplary equipment provided with a liquid supply. The coater 10 is provided in a liquid-processing apparatus such as a coating apparatus or a developing apparatus that uses a liquid such as a resist, pure water, or a solvent.

FIG. 1 illustrates a target surface S to which a liquid is ejected. The target surface S is, for example, a surface to be coated with a liquid on a top surface of a substrate such as a semiconductor wafer. The coater 10 is arranged around the target surface S. The coater 10 has an arm 11 and a support 12. The arm 11 is supported by the support 12. The arm 11 is arranged such that a tip end 11a of the arm 11 is located above the target surface S. A nozzle 13, which is a liquid ejection port, is provided at the tip end 11a of the arm 11. The nozzle 13 is connected to a supply system (not illustrated) including a liquid supply source, a valve, and a metering pump, via a pipe (not illustrated) provided inside the arm 11 and the support 12. The coater 10 ejects, from the nozzle 13, the liquid supplied from the supply system. The coater 10 may include a movement mechanism so that the arm 11 is movable in a horizontal direction and a vertical direction. The coater 10 may be configured to be movable to a coating position at which the tip end 11a of the arm 11 is located above the target surface S and a standby position away from the target surface S by rotating the support 12.

A camera 20 is arranged around the coater 10. The camera 20 is arranged such that the arm 11, the nozzle 13, and the target surface S are located within an angle of view of the camera 20, and is configured to be capable of photographing the arm 11 and the nozzle 13 to obtain an image viewed from a side of the arm 11 and the nozzle 13. The camera 20 photographs the situation of the target surface S and the arm 11 having the nozzle 13 at a predetermined frame rate (e.g., 30 fps) during a coating process in which the coater 10 ejects the liquid onto the target surface S.

Figure 2:
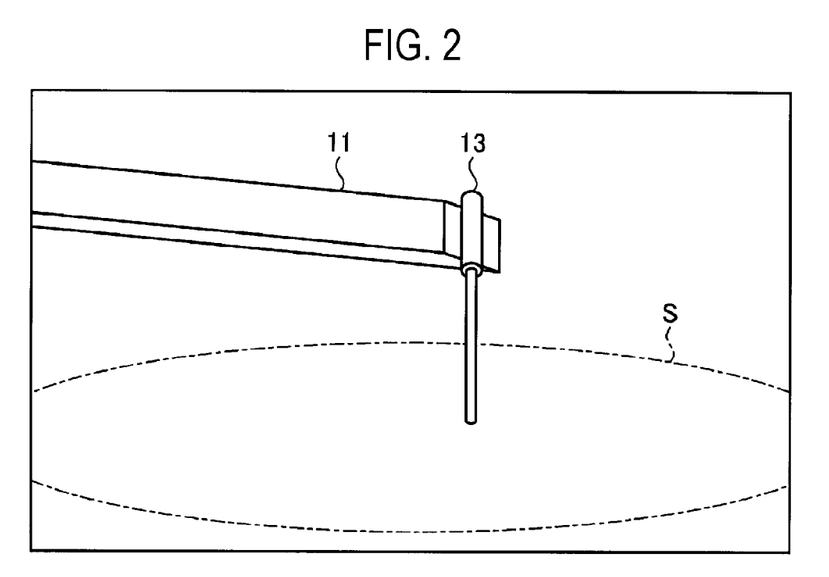
FIG. 2 is a view illustrating an exemplary image obtained by photographing a monitoring object according to an embodiment.

FIG. 2 is a view illustrating an exemplary image obtained by photographing a monitoring object according to an embodiment. FIG. 2 illustrates an exemplary image captured by the camera 20. In the image illustrated in FIG. 2, the images of the arm 11, the nozzle 13, and the target surface S are captured. In FIG. 2, the liquid is being ejected from the nozzle 13, and the target surface S is being coated with the liquid.

The image data of an image captured by the camera 20 is output to an abnormality detection apparatus, and abnormality detection is performed.

[Configuration of Abnormality Detection Apparatus]

Figure 3:
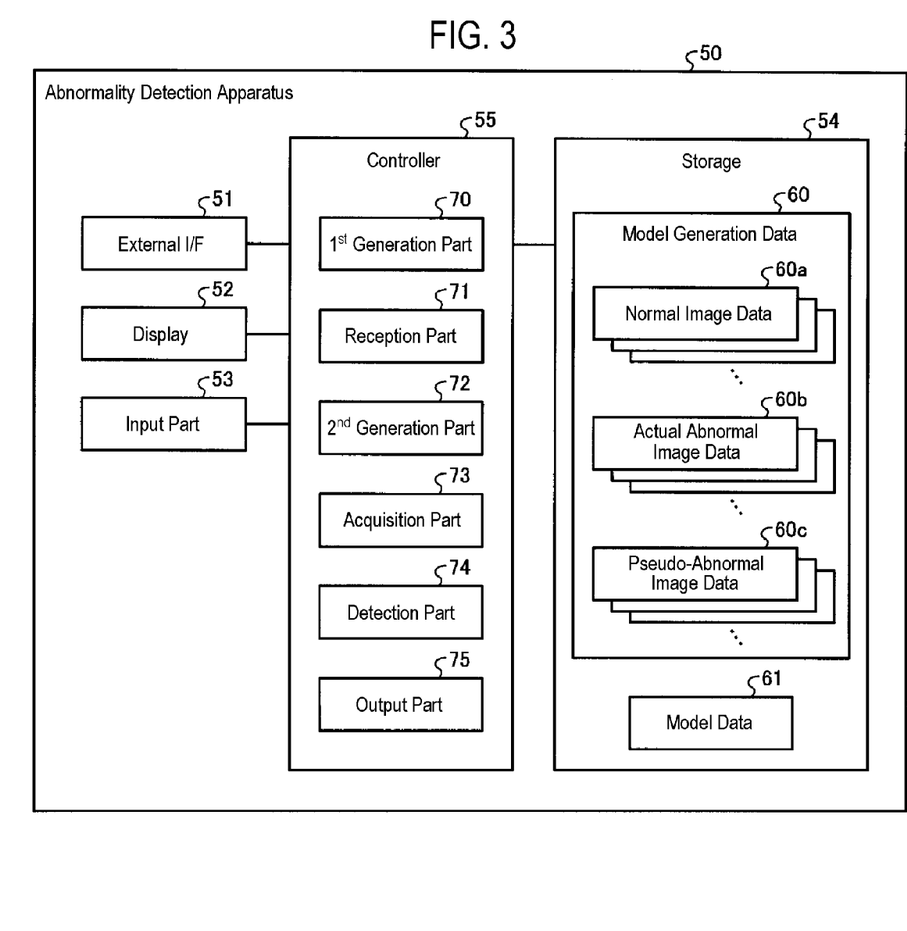
FIG. 3 is a block diagram schematically illustrating a configuration of an abnormality detection apparatus according to an embodiment.

Next, an abnormality detection apparatus will be described in detail. FIG. 3 is a block diagram schematically illustrating a configuration of an abnormality detection apparatus 50 according to an embodiment. The abnormality detection apparatus 50 is, for example, a computer such as a personal computer or a server computer. The abnormality detection apparatus 50 includes an external interface (I/F) 51, a display 52, an input part 53, a storage 54, and/or a controller 55. The abnormality detection apparatus 50 may have various functional parts of a known computer in addition to the functional parts illustrated in FIG. 3.

The external I/F 51 is an interface for inputting/outputting information to and from other devices. For example, the external I/F 51 is a communication interface such as a universal serial bus (USB) port or a LAN port. Image data of an image captured by the camera 20 is input to the external I/F 51.

The display 52 is a display device that displays various types of information. The display 52 may be a display device such as a liquid crystal display (LCD) or a cathode ray tube (CRT). The display 52 displays various types of information.

The input part 53 is an input device for inputting various types of information. For example, the input part 53 may include an input device such as a mouse or a keyboard. The input part 53 receives an operation input from, for example, an administrator, and inputs operation information indicating received operation content to the controller 55.

The storage 54 is a storage device that stores various types of data. For example, the storage 54 is a storage device such as a hard disc, a solid state drive (SSD), or an optical disc. The storage 54 may be a semiconductor memory that is capable of rewriting data, such as a random access memory (RAM), a flash memory, or a nonvolatile static random access memory (NVSRAM).

The storage 54 stores an operating system (OS) and/or various programs executed by the controller 55. For example, the storage 54 stores various programs including a program that executes a generation process or an abnormality detection process to be described later. The storage 54 stores various data used in the programs executed by the controller 55. For example, the storage 54 stores model generation data 60 and model data 61. In addition to the data illustrated above, the storage 54 may also store other data.

The model generation data 60 is data used for generating a determination model to be described later. The model generation data 60 includes various data used for generating the determination model. For example, the model generation data 60 includes multiple pieces of normal image data 60a, multiple pieces of actual abnormal image data 60b, and multiple pieces of pseudo-abnormal image data 60c.

The normal image data 60a is data of an image obtained by photographing a monitoring object that operates normally. For example, the normal image data 60a is image data of an image obtained in the state in which the coater 10 ejects a liquid without causing an abnormality such as dripping or dropping of a liquid. Here, the term "dripping" refers to a state in which liquid droplets hang from the nozzle 13 or the arm 11. Further, the term "dropping" refers to a state in which liquid has flowed down from the nozzle 13 and the arm 11. For example, multiple pieces of image data obtained by photographing a series of operations in which the coater 10 ejects the liquid without causing an abnormality by the camera 20 are stored as the normal image data 60a.

The actual abnormality image data 60b is image data obtained by photographing a monitoring object in which an abnormality has occurred. For example, the actual abnormality image data 60b is image data when the coater 10 causes an abnormality such as dripping or dropping. For example, when an abnormality occurs in the coater 10, image data captured by the camera 20 is stored as the actual abnormality image data 60b.

The pseudo-abnormal image data 60c is image data obtained in a state in which an image when an abnormality occurs is pseudo-generated. Details of the pseudo-abnormal image data 60c will be described later.

The model data 61 is data that stores a determination model generated using a learning model such as AI.

The controller 55 is a device that controls the abnormality detection apparatus 50. As the controller 55, an electronic circuit such as a central processing unit (CPU) or a microprocessing unit (MPU), or an integrated circuit such as an application-specific integrated circuit (ASIC) or a field programmable gate array (FPGA) may be adopted. The controller 55 has an internal memory for storing programs and control data that define various processing procedures, and executes various processes using these programs or data. The controller 55 serves as various processing parts by executing various programs. For example, the controller 55 includes a first generation part 70, a reception part 71, a second generation part 72, an acquisition part 73, a detection part 74, and an output part 75.

In abnormality detection using a learning model, when the learning model is made to learn only the normal image data 60a, it may not be possible to accurately detect an abnormality in a narrow range. Therefore, the learning model may also learn the actual abnormal image data 60b in cases where an abnormality occurs in the monitoring object. However, in reality, there are various places where an abnormality occurs in a monitoring object, and there are cases where an abnormality rarely occurs in a monitoring object. For example, the coater 10 may cause an abnormality such as dripping or dropping from the nozzle 13. In the coater 10, liquid leakage may occur from a pipe inside the arm 11, and an abnormality, such as dripping or dropping from the arm 11, may occur. The coater 10 is designed so as to prevent the occurrence of an abnormality, such as dripping or dropping. Therefore, an abnormality rarely occurs in the coater 10. For example, an abnormality rarely occurs in the arm 11. For this reason, it may be difficult to acquire abnormal image data in the state in which an abnormality actually occurs in a monitoring object. For example, it is difficult to acquire image data in a state in which an abnormality, such as dripping or dropping, actually occurs at various places in the arm 11. As a result, an abnormality may not be detected accurately through abnormality detection using a learning model.

Therefore, the first generation part 70 generates pseudo-abnormal image data 60c obtained by partially changing the image of the normal image data 60a. For example, the first generation part 70 generates the pseudo-abnormal image data 60c by synthesizing a substantially circular image at a random position of the image of the normal image data 60a. The substantially circular shape includes a circular shape and an elliptical shape. As an example, the first generation part 70 generates the pseudo-abnormal image data 60c by performing random erasing on the image of the normal image data 60a and synthesizing a substantially circular image at a random position of the image of the normal data 60a. Here, random erasing is a technique of increasing an amount of teaching data as normal image data by generating images by masking random partial rectangular areas in an image to be teaching data, usually for the purpose of improving the robustness of determination. In the present embodiment, the pseudo-abnormal image data 60c, which is pseudo-abnormal, is generated by synthesizing a substantially circular image having a shape similar to an abnormality such as dripping or dropping with an image of normal image data 60a using the random erasing.

The first generation part 70 generates multiple pieces of pseudo-abnormal image data by partially changing an image for each of multiple pieces of normal image data obtained by photographing a series of operations of a monitoring object that operates normally. For example, the first generation part 70 generates multiple pieces of pseudo-abnormal image data 60c by partially changing an image for each of multiple pieces of normal image data 60a obtained by photographing a series of operations in which the coater 10 ejects a liquid without causing an abnormality. For example, in the present embodiment, multiple pieces of image data obtained using the camera 20 by photographing a series of operations in which the coater 10 ejects a liquid without causing an abnormality ten times are each stored as normal image data 60a. The first generation part 70 generates the pseudo-abnormal image data 60c by synthesizing a substantially circular image at one random position on an image of one piece of normal image data 60a that corresponds to one out of the ten times of the series of operations.

Here, in the monitoring object, the place where an abnormality occurs may be biased to a specific range. In addition, the size of an abnormal place in an image may be biased to a specific size or less. For example, the coater 10 causes an abnormality such as dripping or dropping in the nozzle 13 or arm 11. In addition, the dripping or dropping occurs within a narrow range with a small size.

Therefore, the reception part 71 receives designation of a range within which an image is to be synthesized and a size of the image to be synthesized. For example, the reception part 71 causes the display unit 52 to display a screen for designating the range within which the image is to be synthesized and the size of the image to be synthesized, and receives, from the input part 53, the designation of the range within which the image is to be synthesized and the size of the image to be synthesized.

The first generation part 70 generates pseudo-abnormal image data 60c obtained by synthesizing a substantially circular image at a random position within the designated range with a size smaller than or equal to the size designated by the reception part 71. For example, when detecting dripping or dropping from the nozzle 13 or arm 11 as an abnormality, an administrator designates a range including the nozzle 13 or arm 11 and the maximum size of the dripping or dropping droplets. The first generation part 70 generates the pseudo-abnormal image data 60c obtained by synthesizing a substantially circular image having a size smaller than or equal to the designated size at random positions within the designated range including the nozzle 13 or the arm 11.

Figure 4:
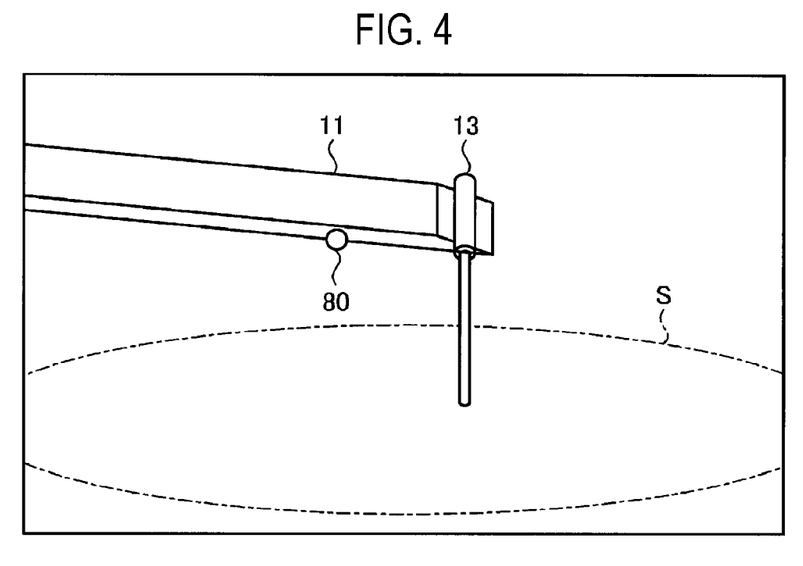
FIG. 4 is a view illustrating exemplary pseudo-abnormal image data according to an embodiment.

FIG. 4 is a view illustrating exemplary pseudo-abnormal image data 60c according to an embodiment. FIG. 4 illustrates a pseudo-abnormal image obtained by synthesizing a white and substantially circular image 80 with the image illustrated in FIG. 2. In FIG. 4, the white and substantially circular image 80 is synthesized near the bottom surface of the arm 11.

The color of the image 80 to be synthesized is not limited to white. The color of the image 80 to be synthesized may be predetermined. The color of the image 80 to be synthesized may be determined from the normal image data 60a. For example, the first generation part 70 may generate pseudo-abnormal image data 60c obtained by synthesizing a substantially circular image 80 having brightness set to a brightness value of a predetermined ratio (e.g., 20%) when the brightness values of the pixels of the image of the normal image data 60a are arranged in a descending order from the top. By determining the color of the image 80 to be synthesized based on the normal image data 60a in this manner, it is possible to synthesize the image 80 with a color similar to the color of the actual image. By synthesizing the image 80 with a color similar to the color of the actual image in this manner, an actual occurrence of an abnormality can be detected with high accuracy.

The second generation part 72 generates a determination model for determining whether a monitoring object is normal or abnormal by performing learning of multiple pieces of normal image data 60a, multiple pieces of actual abnormal image data 60b, and multiple pieces of pseudo abnormal image data 60c. For example, the second generation part 72 adds additional information that the multiple pieces of normal image data 60a are normal to the multiple pieces of normal image data 60a, and adds additional information that the multiple pieces of actual abnormal image data 60b and the multiple pieces of pseudo-abnormal image data 60c are abnormal to the multiple pieces of actual abnormal image data 60b and the multiple pieces of pseudo-abnormal image data 60c. For example, the determination model is a model that outputs image data when image data is input. The second generation part 72 performs learning such that the reproducibility of normal image data is high and the reproducibility of abnormal image data is low by, for example, opposite learning, and generates a determination model that outputs image data with high reproducibility for normal image data. By performing learning of the pseudo-abnormal image data 60c, the determination model may learn an abnormality that rarely occurs in reality from the pseudo-abnormal image data 60c. Therefore, the determination accuracy of the determination model is improved. The second generation part 72 may generate a determination model by performing learning of the multiple pieces of normal image data 60a and the multiple pieces of pseudo-abnormal image data 60c without using the multiple pieces of actual abnormal image data 60b. However, by generating a determination model that has learned the actual abnormal image data 60b in addition to the normal image data 60a and the pseudo-abnormal image data 60c, the determination model is able to increase the difference in reproducibility between the normal image data and the abnormal image data, thereby improving the determination accuracy.

The second generation part 72 stores data of the generated determination model in the storage 54 as model data 61.

The acquisition part 73 acquires image data obtained by photographing a monitoring object. For example, the acquisition part 73 acquires image data output from the camera 20 via the external I/F 51.

Figure 5:
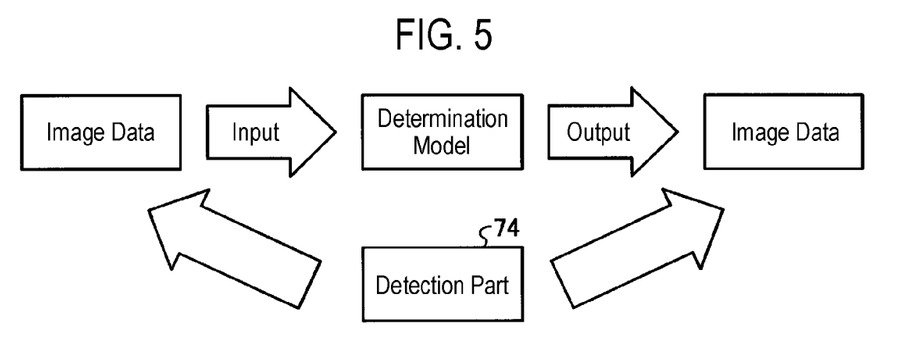
FIG. 5 is a view schematically illustrating exemplary abnormality detection according to an embodiment.

The detection part 74 detects an abnormality of the monitoring object from the image data acquired by the acquisition part 73 using the determination model of the model data 61. FIG. 5 is a view schematically illustrating exemplary abnormality detection according to an embodiment. For example, the detection part 74 inputs the acquired image data to the determination model. The determination model outputs image data. When the output image data is normal image data, the reproducibility of the input image data is high, and when it is abnormal image data, the reproducibility is low. The detection part 74 compares the output image data with the input image data so as to obtain a difference between the output image data and the input image data. For example, the detection part 74 obtains a change in the pixel value of each pixel as a difference. When the obtained difference is within a predetermined threshold value, the detection part 74 determines that the input image data is normal, and when the difference exceeds the threshold value, the detection part 74 determines that the input image data is abnormal, thereby detecting the abnormality.

The determination model may be the following model. For example, the second generation part 72 adds additional information that the multiple pieces of normal image data 60a are normal to the multiple pieces of normal image data 60a, and adds additional information that the multiple pieces of actual abnormal image data 60b and the multiple pieces of pseudo-abnormal image data 60c are abnormal to the multiple pieces of actual abnormal image data 60b and the multiple pieces of pseudo-abnormal image data 60c. Then, the second generation part 72 generates a determination model for determining whether the input image data is normal or abnormal and for outputting a determination result by performing machine learning, such as deep learning, using the multiple pieces of normal image data 60a, the multiple pieces of actual abnormal image data 60b, and the multiple pieces of pseudo-abnormal image data 60c. The detection part 74 inputs the acquired image data to the determination model. The determination model outputs whether the input image data is normal or abnormal. The detection part 74 detects an abnormality using the output result of normality and abnormality of the determination model. In this case as well, the second generation part 72 may generate a determination model by performing learning of the multiple pieces of normal image data 60a and the multiple pieces of pseudo-abnormal image data 60c without using the multiple pieces of actual abnormal image data 60b. However, by generating a determination model that has learned the actual abnormal image data 60b in addition to the normal image data 60a and the pseudo-abnormal image data 60c, the determination model is improved in determination accuracy of normality and abnormality.

In some cases, noise may be temporarily generated in image data captured by the camera 20, and it may be detected that an abnormality has occurred in the coater 10 even though the coater 10 is normal. When the camera 20 photographs a series of operations in which the coater 10 applies a liquid, an abnormality such as dripping or dropping is detected in multiple pieces of image data. Therefore, the detection part 74 may detect that an abnormality has occurred in the monitoring object when it is determined that an abnormality has occurred in a predetermined number of pieces of continuously captured image data. For example, when it is determined that an abnormality has occurred in three continuously captured image data, the detection part 74 detects that an abnormality has occurred in the coater 10. As a result, the accuracy of determining an abnormality is improved.

The output part 75 outputs the detection result of the detection part 74. For example, when an abnormality is detected by the detection part 74, the output part 75 outputs to the display 52 an indication that an abnormality has occurred. The output part 75 may output the data of the determination result of the detection part 74 to another device. For example, when the detection part 74 determines that an abnormality has occurred, the output part 75 may output data to the effect that an abnormality has occurred in a management device that manages the device on which the coater 10 is mounted.

[Flow of Process]

Figure 6:
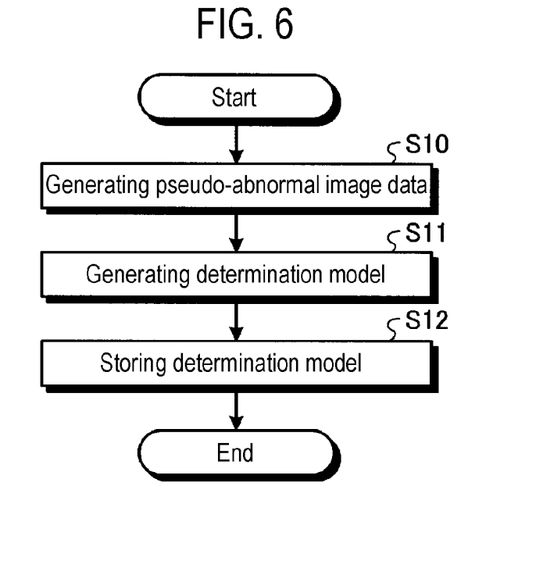
FIG. 6 is a flowchart illustrating an exemplary flow of a generation process according to an embodiment.

Next, a flow of various processes performed by the abnormality detection apparatus 50 according to an embodiment will be described. First, a flow of a generation process in which the abnormality detection apparatus 50 according to the embodiment generates a determination model will be described. FIG. 6 is a flowchart illustrating an exemplary flow of a generation process according to an embodiment.

The first generation part 70 generates pseudo-abnormal image data 60c obtained by partially changing an image of normal image data 60a (Step S10). For example, the first generation part 70 generates pseudo-abnormal image data 60c obtained by synthesizing a substantially circular image at a random position of the image of the normal image data 60a.

The second generation part 72 generates a determination model for determining whether a monitoring object is normal or abnormal by performing learning of the normal image data 60a, the actual abnormal image data 60b, and the pseudo abnormal image data 60c (Step S11). The second generation part 72 stores data of the generated determination model in the storage 54 as the model data 61 (Step S12) and terminates the process.

Figure 7:
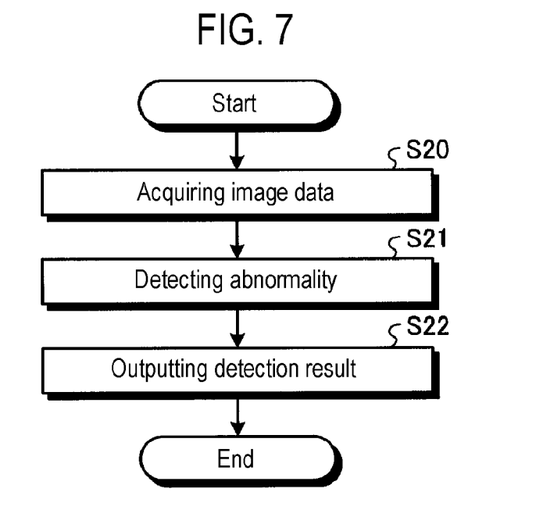
FIG. 7 is a flowchart illustrating an exemplary flow of an abnormality detection process according to an embodiment.

Next, a flow of a generation process in which the abnormality detection apparatus 50 according to the embodiment detects an abnormality using the determination model will be described. FIG. 7 is a flowchart illustrating an exemplary flow of an abnormality detection process according to an embodiment.

The acquisition part 73 acquires image data obtained by photographing a monitoring object (Step S20). For example, the acquisition part 73 acquires the image data output from the camera 20 via the external I/F 51.

The detection part 74 detects an abnormality of the monitoring object from the image data acquired by the acquisition part 73 using the determination model of the model data 61 (Step S21).

The output part 75 outputs the detection result of the detection part 74 (Step S22) and terminates the process.

As described above, the abnormality detection apparatus 50 according to the embodiment includes the first generation part 70, the second generation part 72, the acquisition part 73, and the detection part 74. The first generation part 70 generates pseudo-abnormal image data 60c obtained by synthesizing a substantially circular image at a random position of an image of normal image data 60a, which is obtained by photographing equipment (the coater 10) that supplies a liquid from a liquid supply (the nozzle 13) normally (that is, without an abnormality). The second generation part 72 generates a determination model for determining whether the equipment is normal or abnormal by performing learning of the normal image data 60a and the pseudo-abnormal image data 60c. The acquisition part 73 acquires image data obtained by photographing the equipment. The detection part 74 detects an abnormality in the equipment from the image data acquired by the acquisition part 73 using the determination model. As a result, since the determination model is capable of learning an abnormality that rarely occurs in reality from the pseudo-abnormal image data 60c, the abnormality detection apparatus 50 is capable of detecting an abnormality with high accuracy.

In addition to the normal image data 60a and the pseudo-abnormal image data 60c, the second generation part 72 generates the determination model by performing learning of actual abnormal image data 60b obtained by photographing the equipment (the coater 10) in which an abnormality has occurred. As a result, since the determination model is capable of learning an abnormality that actually occurred from the actual abnormal image data 60b, the abnormality detection apparatus 50 is capable of detecting an abnormality with higher accuracy.

Further, the equipment (the coater 10) may include the arm 11 provided with a pipe or a nozzle 13 configured to eject a liquid. The first generation part 70 generates pseudo-abnormal image data 60c obtained by synthesizing a substantially circular image 80 at a random position of the image of the normal image data 60a. As a result, the abnormality detection apparatus 50 is capable of detecting an abnormality such as dripping or dropping with higher accuracy.

In addition, the abnormality detection apparatus 50 further includes a reception part 71. The reception part 71 receives designation of a range within which a substantially circular image is to be synthesized and/or a size of the substantially circular image to be synthesized. The first generation part 70 generates pseudo-abnormal image data 60c obtained by synthesizing a substantially circular image at a random position within the designated range with a size smaller than or equal to the size designated by the reception part 71. As a result, the abnormality detection apparatus 50 is capable of detecting an abnormality with high accuracy by appropriately designating the range in which an image is to be synthesized and the size of the image to be synthesized that correspond to an abnormality to be detected.

Further, when brightness values of pixels of the image of the normal image data 60a are arranged in a descending order, the first generation part 70 generates pseudo-abnormal image data 60c obtained by synthesizing a substantially circular image having brightness set to a brightness value of a predetermined ratio from the top. As a result, the abnormality detection apparatus 50 is capable of detecting an abnormality that actually occurred with high accuracy.

In addition, the first generation part 70 generates multiple pieces of pseudo-normal image data 60c obtained by synthesizing a substantially circular image at a random position of an image for each of multiple pieces of normal image data 60a, which is obtained by photographing a series of operations of the equipment (the coater 10) that operates normally (that is, without an abnormality). The second generation part 72 generates a determination model for determining whether the equipment is normal or abnormal by performing learning of the multiple pieces of normal image data 60a and the multiple pieces of pseudo-abnormal image data 60c. The acquisition part 73 acquires multiple pieces of image data obtained by photographing a series of operations of the equipment. The detection part 74 determines whether the multiple pieces of image data acquired by the acquisition part 73 are normal or abnormal using the determination model, and when any of the multiple pieces of image data is determined to be abnormal, the detection part 74 detects that an abnormality has occurred in the equipment. As a result, since it is possible to cause the determination model to learn a series of operations of the equipment, the abnormality detection apparatus 50 is capable of detecting an abnormality that has occurred during the series of operations of the equipment with high accuracy.

Further, the detection part 74 detects that an abnormality has occurred in the equipment when a predetermined number of continuously captured pieces among the multiple pieces of image data is determined to be abnormal. As a result, the accuracy of the abnormality detection apparatus 50 in determining an abnormality is improved.

Although embodiments have been described above, it should be considered that the embodiments disclosed herein are illustrative and are not restrictive in all respects. Indeed, the embodiments described above can be implemented in various forms. In addition, the embodiments described above may be omitted, replaced, or modified in various forms without departing from the scope of the claims.

For example, in the embodiments described above, the cases in which the equipment to be monitored is the coater 10 have been described as an example. However, the present disclosure is not limited thereto. Any unit may correspond to the equipment as long as the unit is provided with a liquid supply that ejects (supplies) a liquid.

In the embodiments described above, the cases in which an abnormality such as dripping or dropping have been described as an example, but the present disclosure is not limited thereto. Any abnormality may be detected.

In the embodiments described above, the cases in which the abnormality detection apparatus 50 generates a determination model have been described as an example, but the present disclosure is not limited thereto. The determination model may be generated by another device, and may be stored in the storage 54 of the abnormality detection apparatus 50. The abnormality detection apparatus 50 may detect an abnormality of the equipment from acquired image data using a determination model generated by another device and stored in the storage 54.

According to the present disclosure, it is possible to detect an abnormality with high accuracy.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the scope of the disclosures. The accompanying claims and their equivalents are intended to cover such forms or modifications as would fall within the scope of the disclosures.

What is claimed is:

1. An abnormality detection apparatus comprising:
a first generation part configured to generate pseudo-abnormal image data by synthesizing a substantially circular image at a random position of an image of normal image data obtained by photographing equipment that includes a liquid supply and supplies a liquid from the liquid supply without an abnormality;
a second generation part configured to generate a determination model for determining whether the equipment is normal or abnormal by performing learning of the normal image data and the pseudo-abnormal image data;
an acquisition part configured to acquire image data obtained by photographing the equipment; and
a detection part configured detect an abnormality in the equipment from the image data acquired by the acquisition part using the determination model.

2. The abnormality detection apparatus of claim 1, wherein the second generation part is further configured to generate the determination model by performing learning of actual abnormal image data obtained by photographing the equipment in which an abnormality has occurred, in addition to the normal image data and the pseudo-abnormal image data.

3. The abnormality detection apparatus of claim 2, wherein the liquid supply includes an arm provided with a pipe or a nozzle configured to eject the liquid.

4. The abnormality detection apparatus of claim 3, further comprising:
a reception part configured to receive designation of a range within which the substantially circular image is to be synthesized and/or a size of the substantially circular image to be synthesized,
wherein the first generation part is further configured to generate the pseudo-abnormal image data by synthesizing the substantially circular image at the random position within the designated range with a size smaller than or equal to the size designated by the reception part.

5. The abnormality detection apparatus of claim 4, wherein the first generation part is further configured to generate the pseudo-abnormal image data obtained by synthesizing the substantially circular image having brightness set to a brightness value of a predetermined ratio when brightness values of pixels of the image of the normal image data are arranged in a descending order from the top.

6. The abnormality detection apparatus of claim 5, wherein the first generation part is further configured to generate multiple pieces of pseudo-normal image data by synthesizing a substantially circular image at a random position of an image for each of multiple pieces of normal image data obtained by photographing a series of operations of the equipment that operates without an abnormality,
wherein the second generation part is further configured to generate the determination model for determining whether the equipment is normal or abnormal by performing learning of the multiple pieces of normal image data and the multiple pieces of pseudo-abnormal image data,
wherein the acquisition part is further configured to acquire multiple pieces of image data obtained by photographing a series of operations of the equipment, and
wherein the detection part is further configured to determine whether the multiple pieces of image data acquired by the acquisition part are normal or abnormal using the determination model, and detect that an abnormality has occurred in the equipment when any of the multiple pieces of image data is determined to be abnormal.

7. The abnormality detection apparatus of claim 6, wherein the detection part is further configured to detect that an abnormality has occurred in the equipment when a predetermined number of continuously captured pieces among the multiple pieces of image data is determined to be abnormal.

8. The abnormality detection apparatus of claim 1, wherein the liquid supply includes an arm provided with a pipe or a nozzle configured to eject the liquid.

9. The abnormality detection apparatus of claim 1, further comprising:
a reception part configured to receive designation of a range within which the substantially circular image is to be synthesized and/or a size of the substantially circular image to be synthesized,
wherein the first generation part is further configured to generate the pseudo-abnormal image data by synthesizing the substantially circular image at the random position within the designated range with a size smaller than or equal to the size designated by the reception part.

10. The abnormality detection apparatus of claim 1, wherein the first generation part is further configured to generate the pseudo-abnormal image data obtained by synthesizing the substantially circular image having brightness set to a brightness value of a predetermined ratio when brightness values of pixels of the image of the normal image data are arranged in a descending order from the top.

11. The abnormality detection apparatus of claim 1, wherein the first generation part is further configured to generate multiple pieces of pseudo-normal image data by synthesizing a substantially circular image at a random position of an image for each of multiple pieces of normal image data obtained by photographing a series of operations of the equipment that operates without an abnormality,
wherein the second generation part is further configured to generate the determination model for determining whether the equipment is normal or abnormal by performing learning of the multiple pieces of normal image data and the multiple pieces of pseudo-abnormal image data,
wherein the acquisition part is further configured to acquire multiple pieces of image data obtained by photographing a series of operations of the equipment, and
wherein the detection part is further configured to determine whether the multiple pieces of image data acquired by the acquisition part are normal or abnormal using the determination model, and detect that an abnormality has occurred in the equipment when any of the multiple pieces of image data is determined to be abnormal.

12. An abnormality detection apparatus comprising:
   a storage configured to store a determination model for determining whether equipment that includes a liquid supply is normal or abnormal, wherein the determination model is generated by performing learning of pseudo-abnormal image data obtained by synthesizing a substantially circular image at a random position of an image of normal image data, which is obtained by photographing the equipment supplying a liquid from the liquid supply without an abnormality;
   an acquisition part configured to acquire image data obtained by photographing the equipment; and
   a detection part configured to detect an abnormality in the equipment from the image data acquired by the acquisition part using the determination model.

13. The abnormality detection apparatus of claim 12, wherein the liquid supply includes an arm provided with a pipe or a nozzle configured to eject the liquid.

14. An abnormality detection method comprising:
   generating pseudo-abnormal image data by synthesizing a substantially circular image at a random position of an image of normal image data obtained by photographing equipment that includes a liquid supply and supplies a liquid from the liquid supply without an abnormality;
   generating a determination model for determining whether the equipment is normal or abnormal by performing learning of the normal image data and the pseudo-abnormal image data;
   acquiring image data obtained by photographing the equipment; and
   detecting an abnormality in the equipment from the image data acquired using the determination model.

15. The abnormality detection method of claim 14, wherein the liquid supply includes an arm provided with a pipe or a nozzle configured to eject the liquid.

16. The abnormality detection method of claim 15, further comprising:
   receiving designation of a range within which the substantially circular image is to be synthesized and/or a size of the substantially circular image to be synthesized,
   wherein generating the pseudo-abnormal image data includes synthesizing the substantially circular image at the random position within the designated range with a size smaller than or equal to the designated size.

17. The abnormality detection method of claim 16, wherein generating the pseudo-abnormal image data includes synthesizing the substantially circular image having brightness set to a brightness value of a predetermined ratio when brightness values of pixels of the image of the normal image data are arranged in a descending order from the top.

18. The abnormality detection method of claim 14, further comprising:
   receiving designation of a range within which the substantially circular image is to be synthesized and/or a size of the substantially circular image to be synthesized,
   wherein generating the pseudo-abnormal image data includes synthesizing the substantially circular image at the random position within the designated range with a size smaller than or equal to the designated size.

19. An abnormality detection method comprising:
   acquiring image data obtained by photographing equipment that includes a liquid supply; and
   detecting an abnormality in the equipment from the acquired image data using a determination model for determining whether the equipment is normal or abnormal, wherein the determination model is generated by performing learning of pseudo-abnormal image data obtained by synthesizing a substantially circular image at a random position of an image of normal image data obtained by photographing the equipment supplying a liquid from the liquid supply without an abnormality.

20. The abnormality detection method of claim 19, wherein the liquid supply includes an arm provided with a pipe or a nozzle configured to eject the liquid.

* * * * *